(No Model.) 2 Sheets—Sheet 1.
M. NADIEIN.
APPARATUS FOR OBTAINING, SEPARATING, AND DISINFECTING FERTILIZERS.

No. 463,429. Patented Nov. 17, 1891.

WITNESSES:
E. J. Griswold
Robert F. Sanders

INVENTOR
Metrophanes Nadiein
BY his attorneys
Howson & Howson (No Model.) 2 Sheets—Sheet 2.

M. NADIEIN.
APPARATUS FOR OBTAINING, SEPARATING, AND DISINFECTING FERTILIZERS.

No. 463,429. Patented Nov. 17, 1891.

WITNESSES
E. J. Griswold.
John Revell

INVENTOR
Metrophanes Nadiein
BY his attorneys
Howson & Howson.

UNITED STATES PATENT OFFICE.

METROPHANES NADIEÏN, OF ST. PETERSBURG, RUSSIA, ASSIGNOR TO FLORENTIN PAVLENKOFF, OF SAME PLACE.

APPARATUS FOR OBTAINING, SEPARATING, AND DISINFECTING A FERTILIZER.

SPECIFICATION forming part of Letters Patent No. 463,429, dated November 17, 1891.

Application filed February 14, 1889. Renewed August 19, 1891. Serial No. 403,121. (No model.)

*To all whom it may concern:*

Be it known that I, METROPHANES NADIEÏN, a subject of the Emperor of Russia, and residing at St. Petersburg, Russia, have invented some new and useful Improvements in Apparatus for Obtaining, Separating, and Disinfecting a Fertilizer, of which the following is a specification.

This invention has for its object effecting the separation and disinfecting of the solid matter or excreta from the urine and other liquid matter proceeding from water-closets, sinks, and the like, and directly converting the said solid matter into an inodorous matter or fertilizing agent.

The annexed drawings represent an apparatus for an automatic production of a fertilizer according to this invention.

Figure 4:
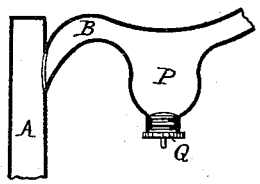
Figure 1:
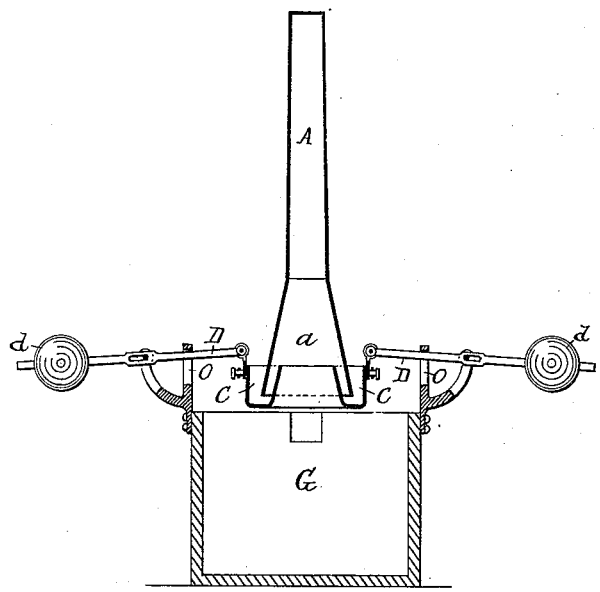
Figure 2:
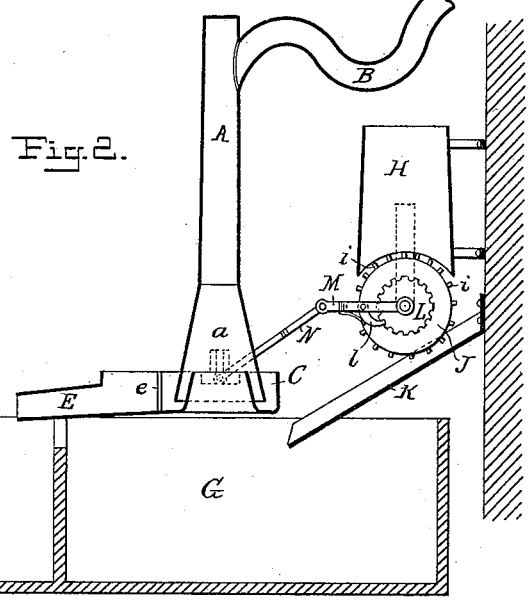
Figure 3:
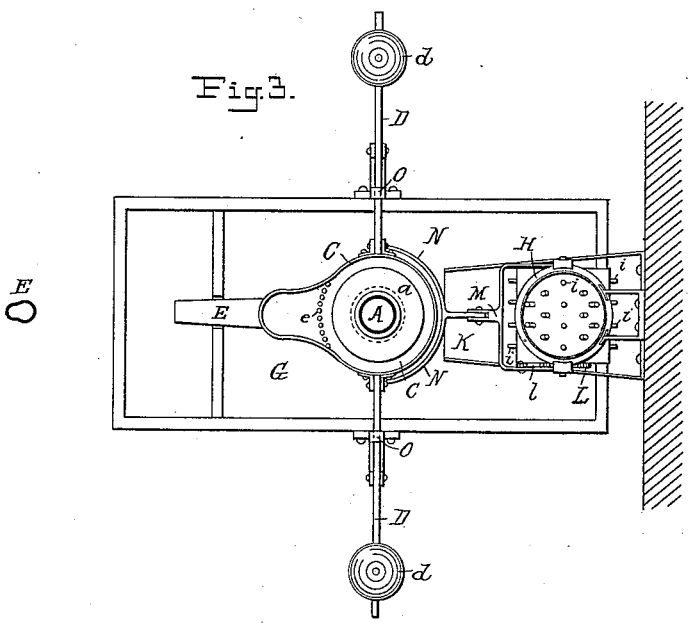

Figure 1 represents a vertical section of this apparatus. Fig. 2 is also a vertical section of the same, but taken at right angles in respect to Fig. 1. Fig. 3 is a horizontal section or plan view. Fig. 4 represents a modification of the siphon tube or trap, as hereinafter explained.

The most essential parts of the apparatus are as follows: First, an inverted siphon or trap which connects the water-closet, sink, or drain to a vertical pipe, being connected to the latter at the required angle, and which produces at its junction with the said vertical pipe the separation of the solid excrement and the water or liquid, as hereinafter explained; second, a vertical pipe with a conical enlargement at the lower end, so arranged that the liquid part flows down the inner sides of the pipe and the solid part falls down the central part of the pipe; third, a movable or oscillating annular trough situated at the lower extremity of the aforesaid vertical pipe and so arranged that the liquid matter flowing down the inner surface of the pipe is received in the trough and the solid matter falling down into the center of the pipe passes through the trough to a suitable box or receptacle underneath; fourth, an apparatus automatically supplying turf or peat or other like disinfecting matter onto the solid excrement in the aforesaid receptacle, and consisting of a hopper or box and a feed-cylinder provided with pins or other equivalent delivery mechanism placed at the lower part of the said hopper or box and controlling the discharge therefrom; fifth, a combination of mechanism whereby the movements of the annular trough or its equivalent are transmitted and converted into an intermittent motion of the mechanism controlling the supply of peat or disinfectant, so that whenever the trough receives a charge of liquid a certain quantity of turf or peat, for example, falls onto the solid excrement.

The liquid and solid excrement mixed with water from a drain-pipe receiving the discharge from water-closets, urinals, washhouse or scullery sinks, and the like, fall into the vertical pipe A after passing through an inverted siphon or trap B. This trap B serves, first, to prevent air or gas from penetrating to the water-closets, and, secondly, it gives the proper direction to the semi-liquid matter which overflows or passes into the vertical pipe A. The lower part or bend of the inverted siphon or trap B may be enlarged in certain cases, forming a chamber P, Fig. 4, provided at the lower parts with an opening closed by a suitable plug or cap Q. This enlargement facilitates the discharge of the solid excrement floating on the liquid. Under the lower edge of the conical enlargement $a$ of the vertical pipe A there is provided an annular trough C, suspended on the extremities of two levers D, provided at the opposite extremities with counter-weights $d$. In place of the two levers D, the annular trough C may be suspended from one lever, for example. The trough C is provided with a spout E, with a grating $e$ to retain extraneous matter, as wisp, pieces of paper, and the like. The water or liquid from the trough C is conducted through the spout E either to a separate receptacle or is discharged directly into the sewer. Underneath the trough there is a suitable box or receptacle G for solid matter, and at a suitable elevation above this receptacle there is a hopper or box H, containing peat or other like disinfecting agent. This box H may be in the form of a hollow cone or a hollow vertical cylinder open at both ends, the bottom end being fitted over a feed-cylinder J, revolving on a horizontal axis, and provided with projecting pins *i i*, which, as the cylinder J rotates, break up the peat in the lower part of the box H and cause it to fall onto an inclined chute K, which directs the peat onto the solid matter in the receptacle G under the trough C. The feed-cylinder J is rotated by means of one or two ratchet-wheels L, acted on by pawls *l*, connected to a lever or levers M, operated by a connecting-rod N, hinged to the annular trough C, hereinbefore described, in such a manner that when the trough is depressed, owing to the weight of the water received from the vertical pipe A, (the extent of such depression being limited by suitable stops O,) the pawl-levers M are moved and cause the feed-cylinder J to describe a fraction of a revolution.

In order to facilitate the removal of the solid matter mixed with peat, which accumulates in the receptacle G under the annular trough, one of the sides of the receptacle may be removable. According to another arrangement, the receptacle may be made movable, being suspended and balanced by a suitable counter-weight so as to discharge its contents automatically when filled and deliver the matter onto a chute or platform, from which it can be removed, as required.

The solid excrement mixed with peat forms an excellent fertilizer, and the addition of peat entirely removes the offensive odor.

In the case of houses provided with suitable cellars for the reception of the siphon or trap arrangement, it is not necessary to provide the usual trap under each water-closet, as the inverted siphon or trap connected with the improved apparatus replaces these traps with advantage.

In addition to the advantage of separating the solid from the liquid excrementitious matter, the apparatus presents the further advantage of never allowing the sewage to remain stagnant at any part, so that the water-closet and sink-water are not allowed time to putrefy. In ordinary cesspools the drain-water is compelled to pass through an enormous body of semi-liquid matter, and is consequently already dirty and putrefying when it reaches the sewer; but with the improved arrangement, according to my invention, the liquid matter or urine passing into the sewer and the solid excrement being collected in the receptacle where it is mixed with peat, decomposition does not take place and the infection or effluvia proceeding from ordinary cesspools is completely obviated. The mixture of excrement and peat being odorless can be removed in the daytime in ordinary open carts. The most important result of the invention is that the apparatus enables a manure or fertilizer to be produced at the place where the excrements are received in the first instance and at the same time separates the solid from the liquid matter.

The most important condition for the economical production of manure is that the solid excrement must be completely separated from the liquid, instead of being mixed therewith, as in the arrangements usually employed. Various methods and processes have heretofore been proposed for accomplishing this separation, but have failed to give the desired results.

The apparatus constructed according to this invention has been proved by trials to be perfectly capable of producing the desired effect, the solid and liquid matter being divided in passing from the trap into the vertical pipe, the liquid part adhering to and flowing down the internal vertical surface of the pipe and being conducted into the annular trough by the action of the conical enlargement, the solid matter falling into the receptacle through the central opening in the said trough, which is suspended under the vertical pipe on a lever or levers. The vertical oscillations of the trough actuate the feed apparatus containing the peat or disinfectant. At the moment when the discharge from the water-closets or sinks falls down the vertical pipe the solid matter falls into the receptacle and the water flows into the trough, which is depressed by the weight, and operates the delivery mechanism of the disinfecting apparatus. The peat or disinfectant is then discharged and falls down a chute onto the solid matter in the receptacle and covers the same. Thus while the solid excrements pass into the receptacle and the water passes into the trough the fertilizer is produced automatically.

I claim as my invention—

1. An apparatus for separating solid matter from liquid, comprising a vertical pipe, a supply-pipe opening into the upper part of the vertical pipe at an angle, an annular receiving-trough for the liquid having an opening beneath the center of the vertical pipe, and a receptacle below, substantially as and for the purpose set forth.

2. An apparatus for separating solid matter from liquid, consisting of the combination, with a drain-pipe, of a vertical pipe into which the drain-pipe opens at an angle and which has a conical enlargement at its lower end, and with a trough below the said pipe having a central opening, as and for the purposes set forth.

3. The combination of a vertical pipe having a conical enlargement at its lower end and a siphon leading to the said pipe with an oscillating trough below the pipe having a central opening, a receptacle beneath the said trough, and apparatus connected to the oscillating trough, for automatically throwing a disinfecting material into the receptacle.

4. The combination of a vertical pipe, an oscillating trough below the same, and a receptacle below the trough with a hopper containing a disinfecting material, a feed-cylinder, and devices connecting the oscillating trough with the cylinder to automatically operate the latter on the oscillation of the trough, substantially as described.

In testimony whereof I have signed my name to this specification in the presence of two subscribing witnesses.

METROPHANES NADIEÏN.

Witnesses:
N. TSCHEKALOFFLE,
J. HIERLING.